INVENTORS:
EUGENE A. PELCZERSKI
JAMES A. KARNAVAS
BY
C. Clark Dougherty Jr.
ATTORNEY 3,717,703
PURIFICATION OF MINE WATER AND THE LIKE
Eugene A. Pelczerski and James A. Karnavas, Pittsburgh, Pa., assignors to Black, Sivalls & Bryson, Inc., Oklahoma City, Okla.
Continuation-in-part of application Ser. No. 745,528, July 17, 1968. This application Sept. 14, 1970, Ser. No. 71,995
Int. Cl. C01b 17/06; C21b 3/04; C22b 5/00
U.S. Cl. 423—571
28 Claims

ABSTRACT OF THE DISCLOSURE

The present invention relates to a process for the purification of mine water whereby potable water is produced and elemental sulfur and iron are recovered as salable products. Solids dissolved and entrained in the mine water are separated therefrom and purified water is withdrawn. The solids are dried and introduced to a molten iron bath containing carbon wherein sulfates contained in the solids are reduced to sulfides, and iron contained in the solids is accumulated. The resultant solids containing sulfides are withdrawn from the iron bath and the sulfides are converted to elemental sulfur. Fuel for providing heat to the molten iron bath may be high sulfur content coal normally unsuitable as fuel because of the air polluting properties of resultant products of combustion. Waste from the process consists of slag which when deposited in a refuse pile will set up into a hard stable product.

CROSS-REFERENCE TO RELATED APPLICATIONS

This application is a continuation-in-part of application Ser. No. 745,528 filed July 17, 1968, and now abandoned.

BACKGROUND OF THE INVENTION

(1) Field of the invention

The present invention relates to the purification of mine water, and more particularly, but not by way of limitation, to the purification of water emanating from mines and the like wherein salable products are continuously recovered from the water as it is purified.

(2) Description of the prior art

Water discharged from active and abandoned mines presents a serious pollution problem in the United States. Mine waters are complex chemical mixtures generally containing hydrogen, iron, sulfate, aluminum, calcium, magnesium sodium, chlorine, and manganese ions in solution. The hydrogen ion concentration can vary from strongly acidic to a relatively strong base range.

Prior to the present invention many processes have been proposed for converting mine water into relatively pure water which can be used for domestic or industrial use or which can be allowed to flow into streams and rivers without causing the pollution thereof. However, these processes have proven to be economically unattractive in that expensive equipment and high operating costs are required for neutralizing the water with an outside source of limestone or other neutralizing agent, and then removing the mineral constituents from the neutralized water. In addition, these prior processes generally produce an unstable or undesirable waste product which when exposed to rain water and other moisture in the atmosphere decomposes causing polluted water to be again formed.

The present invention provides a process for purifying mine water as well as other waste water streams having solids containing sulfates dissolved therein, whereby salable by-products are produced, the revenue from which defrays all or part of the operating cost of the process. In addition, the present invention provides a process whereby slag containing sufficient lime to neutralize acid water is generated from the constituents contained in the water, a part of which can be recycled in the process obviating the need and cost of neutralizing the water with an outside source of limestone or other neutralizing agent. Further, the waste product produced by the present invention is relatively stable which when deposited in a refuse pile will form a hard protective crust through the reaction of lime contained therein with atmospheric carbon dioxide, thus preventing repollution of streams by runoff of atmospheric moisture. High sulfur content coal may be used as fuel for the process of the present invention which normally cannot be used as fuel due to the air polluting properties of the products of combustion generated therefrom.

SUMMARY OF THE INVENTION

The present invention relates to a process for the purification of mine water which comprises separating the water from solids dissolved and entrained therein, withdrawing the separated water, drying the solids, introducing the dried solids into a molten iron bath containing carbon so that sulfates contained in the solids are reduced to sulfides, withdrawing the solids containing sulfides from the iron bath, converting the sulfides to elemental sulfur, and withdrawing the elemental sulfur.

It is, therefore, an object of the present invention to provide a process for the purification of mine water and the like.

A further object of the present invention is the provision of a process for the purification of mine water and the like wherein sulfur removed from the water is recovered in the form of elemental sulfur.

Still a further object of the present invention is to provide a process for the purification of mine water and the like wherein the source of heat for the process may be sulfur-bearing carbonaceous fuel from which the sulfur is removed and recovered in the form of elemental sulfur.

Yet a further object of the present invention is the provision of a process for the purification of mine water and the like wherein iron is removed from the water and fuel utilized in the process and recovered in the form of elemental iron.

Another object of the present invention is the provision of a process for the purification of acid water wherein the acid water is neutralized with slag generated within the process thereby eliminating the necessity and cost of neutralizing the water with an outside source of limestone or other neutralizing agent.

Yet another object of the present invention is the provision of a process for the purification of mine water and the like wherein the combustion of sulfur-bearing carbonaceous fuel may be used as a source of heat energy within the process without the generation of products of combustion which will cause pollution when released to the atmosphere.

Other and further objects, features, and advantages of the present invention will be apparent from the following description of presently preferred embodiments of the invention, given for the purpose of disclosure, and taken in conjunction with the accompanying drawings.

DESCRIPTION OF THE PREFERRED EMBODIMENTS

Figure 1:
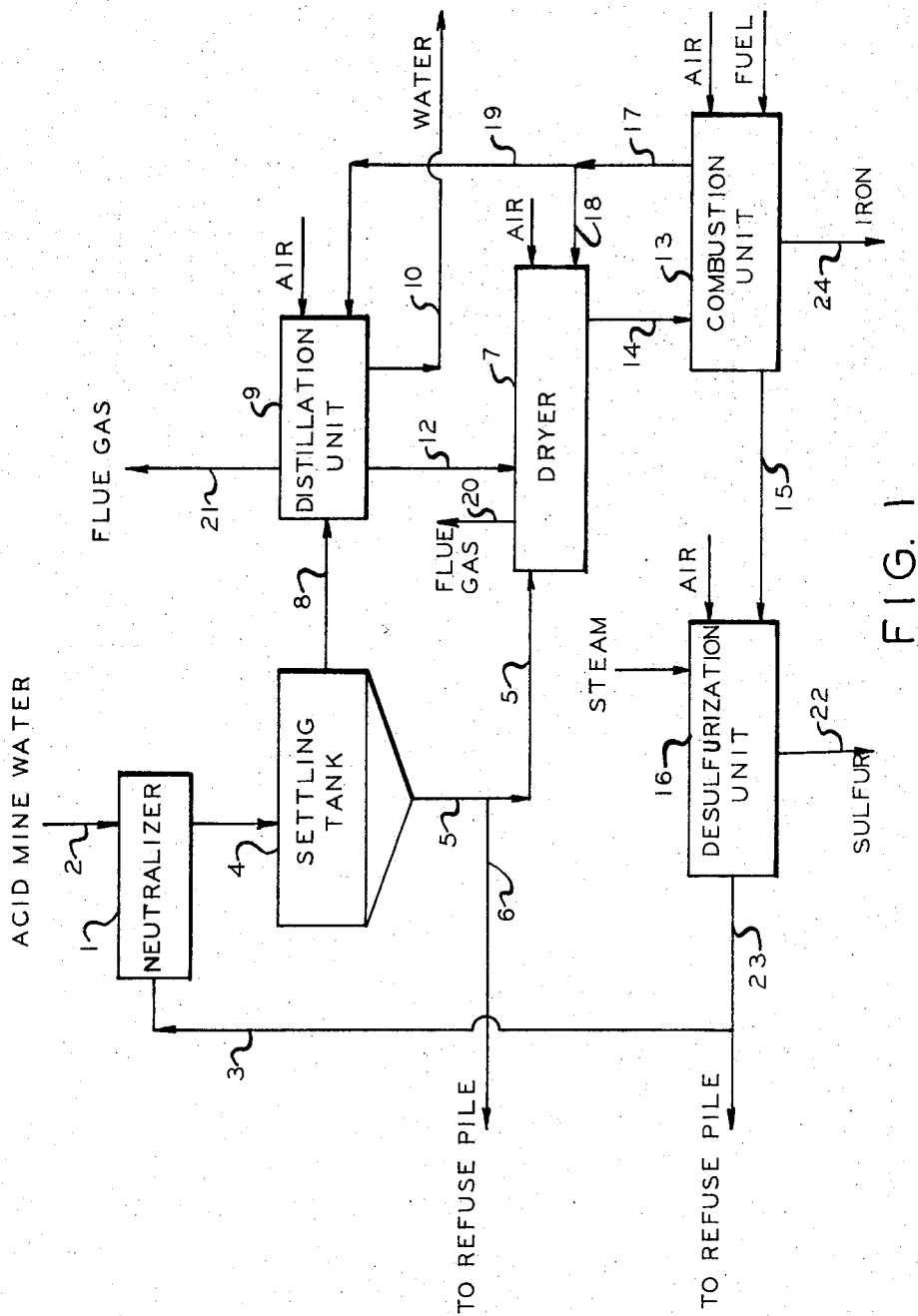
FIG. 1 is a diagrammatic view of a system for carrying out the process of the present invention.

In accordance with the present invention, acid water emanating from a mine, or other stream of waste water having solids containing sulfates dissolved therein, is first neutralized with slag containing lime and magnesia, which slag is generated in the process of the present invention and which will be discussed in detail hereinbelow. If desired, the neutralized water may be distilled into potable water, and solids produced in the distillation process combined with the sludge produced in the neutralization step, which sludge is comprised of water, slag and suspended solids. The combined solids stream is conducted to a dryer wherein water is removed, and the dried solids are then led to a combustion process of the type disclosed in our copending application Ser. No. 717,851, filed Apr. 1, 1968, and now U.S. Pat. 3,533,739. As described therein, the combustion process includes injecting sulfur-bearing carbonaceous fuel beneath the surface of a liquid metal bath such as molten iron. A limited quantity of oxygen or air, which may be preheated, is also injected beneath or at the surface of the bath. Carbon contained in the fuel is absorbed by the iron and preferentially reacts with the air or oxygen to form carbon monoxide which then passes upwardly through the iron bath. Sulfur contained in the fuel is also absorbed by the molten iron, but is prevented from reacting with the air or oxygen by the presence of the more chemically active carbon.

A molten layer of lime-bearing slag is maintained on the surface of the molten iron bath to serve two purposes— first, it functions as a fluxing agent for the ash, i.e., the mixture of incombustible residue from the fuel is rendered into a fluid state, and, second, it causes the sulfur absorbed by the molten iron to be desorbed and to react with the lime contained therein to form stable calcium sulfide.

In the process of the present invention the dried slag and other solids introduced into the combustion process from the dryer contains lime and magnesia which react with sulfur absorbed in the iron bath to form calcium and magnesium sulfide. Sulfur enters the combustion process from two sources, i.e., from the sulfur-bearing carbonaceous fuel injected into the iron bath and from sulfates originally contained in the acid mine water and which enter the combustion process with the dried slag and other solids from the dryer. Under the reducing conditions that exist in the high carbon content iron bath, sulfur compounds such as sulfates and pyrites are reduced to yield sulfur, which then combines with lime and magnesia in the slag layer to form calcium sulfide and magnesium sulfide.

The mixture of gases from the combustion reaction including carbon monoxide are collected and mixed with additional air or oxygen so that carbon monoxide reacts with the oxygen to form carbon dioxide thereby generating the heat required for the drying step and distillation step of the present invention. The carbon dioxide and other gases formed may be disposed of by releasing them to the atmosphere without fear of pollution.

The slag continuously removed from the suface of the iron bath is granulated and desulfurized by contact with air and steam. Oxygen in the air reacts with the steam and calcium sulfide in the slag to form hydrogen sulfide and sulfur dioxide which, in turn, react to form elemental sulfur.

Due to the heat produced in the combustion process iron is produced from iron hydroxide and pyrites contained in the sulfur-bearing carbonaceous fuel and molten elemental iron is continuously removed from the combustion process.

The slag resulting from the desulfurization step consists of a dry mixture of ash, magnesium oxide, calcium hydroxide, calcium oxide and other compounds and is divided into two streams, one stream of which is recycled to the neutralization step. The other stream is combined with a portion of the water, slag and suspended solids from the neutralization step and deposited in a refuse pile. Through the reaction of lime contained in the resultant mixture of waste with atmospheric carbon dioxide, a hard crust forms over the refuse pile producing a hard stable waste product.

Referring now to the drawings, and particularly to FIG. 1, acid water is introduced into neutralizer 1 through conduit 2 where it is intimately contacted with spent slag entering neutralizer 1 through conveyor 3. The spent slag contains metallic oxides and other compounds some of which are lime, magnesia, and ash. While within neutralizer 1 the sulfate ion content of the acid mine water, in excess of those associated with metallic ions or originally present in the water, are neutralized. The neutralization reactions may be written as follows:

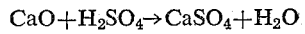
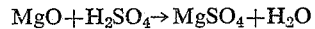

$$CaO + H_2SO_4 \rightarrow CaSO_4 + H_2O$$

$$MgO + H_2SO_4 \rightarrow MgSO_4 + H_2O$$

In addition, depending upon the particular composition of the acid mine water being processed, some hydroxides, sulfates, or other salts of aluminum, magnesium, iron, and calcium will be precipitated in neutralizer 1.

Neutralizer 1 may be any commercially available solids-liquids contactor, which brings about intimate contact between the acid mine water and slag. From neutralizer 1, the neutralized water along with solids suspended therein are pumped into settling tank 4. Settling tank 4 is of a large enough volume to retain the neutralized water for a period of time sufficient to allow nonsoluble ash and some of the precipitated entrained solids to settle out. These settled solids are continuously withdrawn from settling tank 4 through conduit 5. A portion of the settled solids are withdrawn from conduit 5 through conduit 6 from where they are transferred to the refuse pile. The remaining settled solids enter dryer 7. The neutralized water and a portion of the entrained precipitated solids overflow settling tank 4 through conduit 8 from where they are conducted to distillation unit 9. As will be described further hereinbelow, if the water being treated is not acidic, the neutralization step may be omitted and the water led directly to distillation unit 9.

Distillation unit 9 may be any commercially available unit which brings about vaporization and condensation of a majority of the neutralized water leaving the dissolved and entrained solids contained therein in slurry or dry form. The distilled and thus purified water is withdrawn from distillation unit 9 through conduit 10 for distribution to domestic or commercial users, or for introduction into a nearby stream or river. If it is not desirable to produce distilled water, but rather to produce neutralized water only, distillation unit 9 may be omitted from the process of the present invention. In this form of the invention neutralized water is withdrawn from settling tank 4 through conduit 8 and transferred directly to its ultimate destination.

The solids separated from the water in distillation unit 9 are withdrawn from distillation unit 9 through conduit 12 from where they are conducted to dryer 7 and mixed with the non-soluble ash and other solids entering dryer 7 through conduit 5. Dryer 7 may be any commercially available rotary drum or other dryer which brings about the drying of the ash and other solids. From the dryer 7 the dried solids are transferred into combustion unit 13 by any convenient conveying equipment 14.

In combustion unit 13 calcium sulfate contained in the dried solids is reduced to calcium sulfide, and calcium oxide and magnesium oxide contained in the dried solids are converted partially or totally to calcium sulfide and magnesium sulfide by reaction with the sulfur originally contained in the carbonaceous fuel and absorbed in the molten iron bath. These compounds along with ash and other compounds are withdrawn in the form of slag from combustion unit 13 through runner 15 from where they enter desulfurization unit 16.

Carbon monoxide generated in combustion unit 13 is withdrawn through conduit 17, along with quantities of nitrogen and other gases. A portion of the carbon monoxide stream is led through conduit 18 to dryer 7 where it is combusted with air to provide heat energy for drying the wet solids in dryer 7. The remaining portion of the carbon monoxide stream is conducted through conduit 19 to distillation unit 9 where it is reacted with air to provide heat energy for the distillation step. The products of combustion from dryer 7 and distillation unit 9 are vented to the atmosphere through conduits 20 and 21 respectively. Molten iron produced in the combustion unit is removed through conduit 24.

In desulfurization unit 16 the slag stream is granulated and then contacted with water and air so that the calcium and magnesium sulfide are converted to calcium and magnesium hydroxide, and hydrogen sulfide and sulfur dioxide are evolved. The hydrogen sulfide and sulfur dioxide react, are converted into free elemental sulfur and removed through conduit 22 to storage.

The slag withdrawn from the desulfurization unit contains ash, calcium oxide, magnesium oxide, and other compounds. A portion of the slag is conducted through conveyor 23 to the refuse pile. The remaining portion of the slag is recycled through conveyor 5 back to neutralizer 1.

Figure 2:
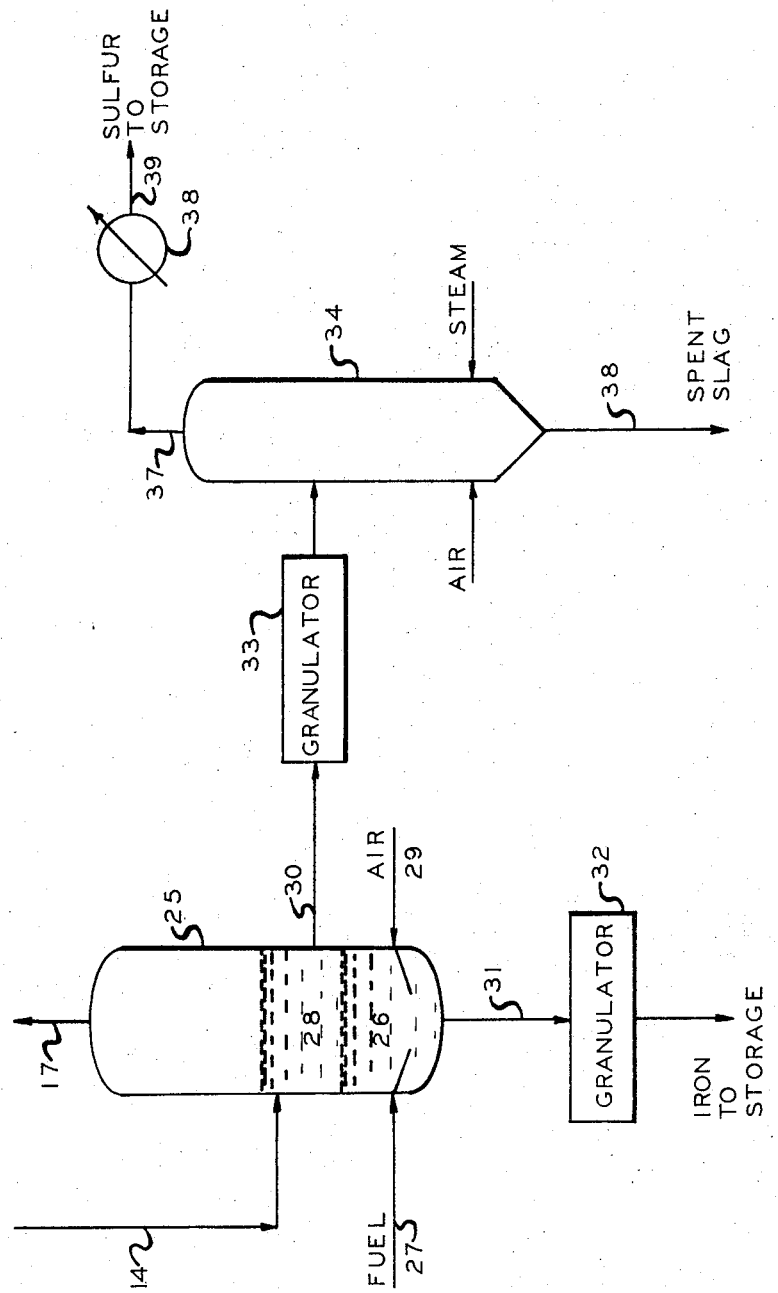
FIG. 2 is a detailed diagrammatic view of the desulfurization and combustion units of FIG. 1.

Turning now to FIG. 2, a more detailed diagrammatic view of combustion unit 13 and desulfurization unit 16 is presented. Combustion vessel 25 contains a molten iron bath 26. Crushed sulfur-bearing carbonaceous fuel is introduced in the lower portion of iron bath 26 through line 27 which may be a water-cooled lance or other similar device. The dried solids from dryer 7 containing calcium and magnesium sulfate, excess calcium and magnesium oxide and other compounds enter combustion vessel 25 through conduit 14 forming a molten layer of slag 28 on the surface of iron bath 26. A limited volume of air is injected into iron bath 26 through lance 29. Upon contact with the molten iron, carbon from the fuel dissolves or is absorbed in the iron and reacts with oxygen from the air to form carbon monoxide. Sulfur from the fuel is also absorbed by the iron, but due to the higher chemical activity of carbon the sulfur is prevented from reacting with the oxygen. The carbon monoxide, thus formed, along with nitrogen from the air pass upwardly through slag layer 28 and out of vessel 25 through conduit 17. As described above, this gas stream containing carbon monoxide is further reacted with air to form carbon dioxide thereby generating heat energy for the distillation and drying steps in the process.

Ash consisting of incombustibles in the fuel rises to the top of iron bath 26 and is fluxed or rendered into a fluid state by the oxides contained in slag layer 28. Slag layer 28 also functions as a desorbing agent for the sulfur contained in iron bath 26—that is, the sulfur reacts with oxides in the slag to form sulfides. These reactions may be written as follows:

$$2CaO + 2S \rightarrow 2CaS + 2[O]$$

$$2MgO + 2S \rightarrow 2MgS + 2[O]$$

Portions of slag layer 28 are continuously withdrawn from combustion vessel 25 through runner 30. Thus, sulfur is continuously removed from combustion vessel 25 in the form of calcium and magnesium sulfide along with ash and other compounds.

Temperatures in the combustion vessel are from approximately 2600° F. to 2800° F. At this level the iron bath remains in a molten state and the necessary heat is supplied for the production of iron from iron hydroxide contained in the solids introduced into combustion vessel 25 from dryer 7, and for the production of iron from pyrites contained in the sulfur-bearing carbonaceous fuel. Thus, molten iron is produced in combustion vessel 25 and is continuously removed through conduit 31. From conduit 31 the molten iron may be granulated in granulator 32 and transferred to storage. Commercial granulating devices are available which cool the molten iron enough to solidify it and at the same time granulate it. No further detailed description is given of such device herein since commercially available units may be employed.

It may now be seen that combustion unit 13 achieves the following functions: First, it provides heat energy for the distillation and drying steps of the process of the present invention; second, it removes sulfur from the fuel, thus generating products of combusion which contain no sulfur compounds and which may be vented to the atmosphere without polluting the atmosphere; third, it brings about the recovery of iron from pyrites contained in the sulfur-bearing fuel and contained in the solids intrduced from dryer 7; and fourth, it brings about the recovery of sulfur from the sulfates originally contained in the acid mine water introduced from dryer 7 and from the sulfur-bearing fuel in the form of sulfides.

The slag removed from combustion vessel 25 through runner 30 is conducted to granulator 33 where it is cooled and granulated. The cooled granulated slag is then conducted to contactor 34, where, as it travels downwardly, it is intimately contacted by steam and air. Contactor 34 contains conventional baffles or other similar means for bringing about intimate contact between the slag and the steam and air passing therethrough.

In contactor 34 the steam reacts with the sulfides in the slag to form hydrogen sulfide. These reactions may be written as follows:

$$CaS + 2H_2O \rightarrow H_2S + Ca(OH)_2$$

$$MgS + 2H_2O \rightarrow H_2S + Mg(OH)_2$$

The hydrogen sulfide thus formed reacts with oxygen from the air to form sulfur dioxide which in turn reacts with additional hydrogen sulfide to form elemental sulfur vapor. These reactions may be written as follows:

$$3H_2S + 1\tfrac{1}{2}O_2 \rightarrow SO_2 + 2H_2S + H_2O$$

$$2H_2S + SO_2 \rightarrow 3S + 2H_2O$$

Alumina and other constituents in the slag catalyze the reaction between the hydrogen sulfide and sulfur dioxide to form elemental sulfur. However, it may be necessary to add additional catalyst depending upon the composition of the acid water being processed and the resulting composition of the slag.

The sulfur vapor passes upwardly within contactor 34 into conduit 37. The reacted slag accumulating in the botom portion of contactor 34 contains unreacted calcium and manganesium oxide, calcium and magnesium hydroxide, ash, and other compounds. This spent slag is conveyed out of contactor 34 through conveyor 38. As described above, a portion of the spent slag is recycled to neutralizer 1 and the remainder is deposited on the refuse pile. The sulfur vapor passing through conduit 37 enters condenser 38 wherein the elemental sulfur vapor is condensed and the condensed sulfur is passed through conduit 39 to sulfur storage. While a preferred desulfurization process has been described, it will be understood that many processes for the recovery of sulfur from calcium sulfide have been developed, any one of which may be utilized in accordance with the present invention.

If the water treated does not require neutralization, or if it is desirable to omit the neutralization step for other reasons, the water may be fed directly to distillation unit 9 without passing through neutralizer 1 and settling tank 4. In this form of the invention solids separated from the water in distillation unit 9 are transferred to dryer 7 through conduit 12 and then to combustion unit 13 through conveyor 14. Sulfates contained in the solids are reduced to sulfides in the same manner as described above while within combustion unit 13. The solids containing sulfides are then conveyed to desulfurization unit 16 where elemental sulfur is produced in the same manner as previously described. The spent solids from desulfurization unit 16 may be discarded directly to the refuse pile. However, since a spent slag stream is generated in the process of the present invention it has been found that neutralizing acid water with spent slag is economically justified in that the distillation unit need not then be constructed from expensive corrosion resistant materials.

In the initial start-up of the present invention it is necessary to introduce sufficient iron into combustion vessel 25 to form molten iron layer 26, and then to introduce sufficient fresh lime therein to flux the ash contained within the combusted fuel and to circulate the resulting slag to neutralizer 1. Once this condition is met, calcium and magnesium brought into the process with the acid mine water being purified provide a calcium oxide and magnesium oxide rich slag stream for recycle through the process.

In order to present a clear understanding of the process of the present invention the following example is given. As will be understood, the quantities of materials and other process conditions may vary depending upon the character and composition of the water being treated, and the present invention is not to be limited to those given in the example.

EXAMPLE

Referring to the drawings, and particularly to FIG. 1, and 8,354 ton/day stream of acid mine water at a temperature of 70° F. and having the following analysis is led by conduit 2 to neutralizer 1:

| | P.p.m. |
|---|---|
| Acidity | 1000 |
| Sulfate content | 3800 |
| Total Iron content | 300 |
| Calcium content | 370 |
| Aluminum content | 60 |
| Magnesium content | 120 |

33 tons/day of recycle slag at a temperature of 70° F. are conducted to neutralizer 1 through conveyor 3, and a total stream of 8,417 tons/day of neutralized water and solids are conducted to settling tank 4 from neutralizer 1. 59 tons/day of solids are separated from the neutralized water in settling tank 4 and 8,358 tons/day of neutralized water at a temperature of 70° F. are led through conduit 8 to distillation unit 9. 8,230 tons/day of potable distilled water are withdrawn from distillation unit 9 at a temperature of 150° F. through conduit 10 and 73 tons/day of solids in a water slurry at a temperature of 150° F. are withdrawn through conduit 12.

A 518 ton/day stream of carbon monoxide and other gases from combustion unit 13 is conducted through conduit 19 to a distillation unit 9 and a 718 ton/day stream of air is reacted therewith to provide heat for carrying out the distillation process resulting in a 1,237 ton/day stream of flue gas at a temperature of 280° F. which is vented to the atmosphere through conduit 21.

The solids-water slurry passing through conduit 12 (73 tons/day of solids) are led to dryer 7 wherein they are combined with 7 tons/day of solids entering dryer 7 through conduit 5. 52 tons/day of solids from settling tank 4 are passed through conduit 6 to the refuse pile. 80 tons/day of dried solids are led from dryer 7 at a temperature of 2200° F. to combustion unit 13 through conveyor 14.

A 91 tons/day stream of carbon monoxide and other gases at a temperature of 2430° F. from combustion unit 13 pass through conduit 18 to dryer 7, and a 126 tons/day stream of air is combusted therewith to provide the heat required in dryer 7 and resulting in a flue gas stream of 318 tons/day at a temperature of 250° F. which is conducted through conduit 20 to the atmosphere.

Referring now to FIG. 2, 167 tons/day of crushed sulfur-bearing coal having the following analysis are supplied to combustion vessel 25 through lance 27:

| Component: | Wt. percent |
|---|---|
| Free carbon | 62.3 |
| Free sulfur | 2.0 |
| Oxygen (as carbon monoxide) | 10.5 |
| Iron pyrites | 3.8 |
| Hydrogen | 4.2 |
| Nitrogen | 1.0 |
| Aluminum oxide | 6.6 |
| Silicon dioxide | 6.6 |
| Water | 3.0 |
| Total | 100.0 |

After initially charging the combustion vessel 25 with sufficient quantities of a dolomitic limestone flux, comprised of 60% by weight calcium carbonate and 40% by weight magnesium carbonate, and iron, the temperature of the combustion reaction is set at 2700° F. A 491 tons/day stream of combustion air at a temperature of 1437° F. is injected into vessel 25 through lance 29, and a total stream of carbon monoxide and other gases in an amount of 647 tons/day at a temperature of 2700° F. is generated and passed out of vessel 25 through conduit 17. Elemental iron in an amount of 3 tons/day is produced in the vessel 25 which is withdrawn therefrom through conduit 31. 86 tons/day of slag are withdrawn from the combustion vessel 25 through runner 30 at a temperature of 2700° F. After cooling and granulation, the slag from combustion vessel 25 is introduced to contactor 34 where it is contacted with 10 tons/day of steam and sufficient air to form elemental sulfur vapor in an amount of 18 tons/day at a temperature of 300° F. The sulfur vapor and other gases are withdrawn from contactor 34 through conduit 37, condensed and stored. Spent slag in an amount of 77 tons/day is produced in contactor 34 and withdrawn therefrom through conveyor 38. 33 tons/day of spent slag are recycled to neutralizer 1 and 44 tons/day are passed to refuse.

The present invention therefore is well adapted to carry out the objects and attain the ends and advantages mentioned as well as those inherent therein. While presently preferred embodiments of the invention are given for the purpose of disclosure, numerous changes in the details of the process and arrangement of steps can be made which will readily suggest themselves to those skilled in the art and which are encompassed within the spirit of the invention and the scope of the appended claims.

What is claimed is:

1. A process for the purification of water having solids containing sulfates dissolved therein which comprises:
    separating said dissolved solids from said water;
    withdrawing said water;
    drying said separated solids;
    introducing said dried solids into a molten iron bath containing carbon so that sulfates contained in said solids are reduced to sulfides;
    withdrawing said solids containing sulfides from said molten iron bath;
    converting said sulfides to elemental sulfur; and withdrawing said elemental sulfur.

2. A process for the purification of water having solids containing sulfates dissolved therein which comprises:
    separating said dissolved solids from said water;
    withdrawing said water;
    drying said separated solids;
    introducing said dried solids into a molten iron bath so that sulfates contained therein are reduced to sulfides;
    introducing oxygen into said molten iron bath;
    introducing carbonaceous fuel into said molten iron bath so that carbon in said fuel reacts with said oxygen to form carbon monoxide;

withdrawing said carbon monoxide from said molten iron bath;
withdrawing said solids containing sulfides from said molten iron bath;
converting said sulfides to elemental sulfur; and
withdrawing said elemental sulfur.

3. The process of claim 2 together with the additional steps of:
reacting said carbon monoxide with additional oxygen so that carbon dioxide is formed thereby providing heat energy; and
withdrawing said carbon dioxide.

4. A process for the purification of water having solids containing sulfates dissolved therein which comprises:
separating said dissolved solids from said water;
withdrawing said water;
drying said separated solids;
introducing said dried solids into a molten iron bath so that sulfates contained therein are reduced to sulfides;
introducing oxygen into said molten iron bath;
introducing sulfur-bearing carbonaceous fuel into said molten iron bath so that carbon in said fuel reacts with said oxygen to form carbon monoxide, and sulfur in said fuel reacts with oxides in said dried solids to form additional sulfides;
withdrawing said carbon monoxide from said molten iron bath;
withdrawing said solids containing sulfides from said molten iron bath;
converting said sulfides to elemental sulfur; and
withdrawing said elemental sulfur.

5. The process of claim 4 together with the additional steps of:
reacting said carbon monoxide with additional oxygen so that carbon dioxide is formed thereby providing heat energy; and
withdrawing said carbon dioxide.

6. A process for the purification of mine water which comprises:
separating said water from solids dissolved and entained therein;
withdrawing said separated water;
drying said solids;
introducing said dried solids into a molten iron bath so that sulfates contained therein are reduced to sulfides and iron hydroxide contained therein reacts to form free iron;
introducing oxygen into said molten iron bath;
introducing sulfur-bearing carbonaceous fuel containing pyrites into said molten iron bath so that carbon in said fuel reacts with said oxygen to form carbon monoxide, sulfur in said fuel reacts with oxides in said dried solids to form additional sulfides, and pyrites in said fuel reacts to form free iron;
withdrawing said carbon monoxide from said molten iron bath;
withdrawing said free iron from said molten iron bath;
withdrawing said solids containing sulfides from said molten iron bath;
converting said sulfides to elemental sulfur; and
withdrawing said elemental sulfur.

7. The process of claim 6 together with the additional steps of:
reacting said carbon monoxide with additional oxygen so that carbon dioxide is formed thereby providing heat energy; and
withdrawing said carbon dioxide.

8. A process for the purification of acid mine water which comprises:
neutralizing said water with slag containing metallic oxides;
separating said water from said slag;
withdrawing said water;
drying said slag;
introducing said dried slag into a molten iron bath containing carbon so that sulfates contained in said slag are reduced to sulfides;
withdrawing slag containing sulfides from said molten iron bath;
converting said sulfides to elemental sulfur;
withdrawing said elemental sulfur; and
recycling at least a portion of said slag containing metallic oxides for neutralizing said water.

9. A process for the purification of acid mine water which comprises:
neutralizing said water with slag containing metallic oxides;
separating said water from said slag;
withdrawing said water;
drying said slag;
introducing said dried slag into a molten iron bath so that sulfates contained therein are reduced to sulfides;
introducing oxygen into said molten iron bath;
introducing carbonaceous fuel into said molten iron bath so that carbon in said fuel reacts with said oxygen to form carbon monoxide;
withdrawing said carbon monoxide from said molten iron bath;
withdrawing slag containing sulfides from said molten iron bath;
converting said sulfides to elemental sulfur;
withdrawing said elemental sulfur; and
recycling at least a portion of said slag containing metallic oxides for neutralizing said water.

10. The process of claim 9 together with the additional steps of:
reacting said carbon monoxide with additional oxygen so that carbon dioxide is formed thereby providing heat energy; and
withdrawing said carbon dioxide.

11. A process for the purification of acid mine water which comprises:
neutralizing said water with slag containing metallic oxides;
separating said water from said slag;
withdrawing said water;
drying said slag;
introducing said dried slag into a molten bath so that sulfates contained therein are reduced to sulfides;
introducing oxygen into said molten iron bath;
introducing sulfur-bearing carbonaceous fuel into said molten iron bath so that carbon in said fuel reacts with said oxygen to form carbon monoxide, and sulfur in said fuel reacts with metallic oxides in said slag to form additional sulfides;
withdrawing said carbon monoxide from said molten iron bath;
withdrawing slag containing sulfides from said molten iron bath;
converting said sulfides to elemental sulfur;
withdrawing said elemental sulfur; and
recycling at least a portion of said slag containing metallic oxides for neutralizing said water.

12. The process of claim 11 together with the additional steps of:
reacting said carbon monoxide with additional oxygen so that carbon dioxide is formed thereby providing heat energy; and
withdrawing said carbon dioxide.

13. A process for the purification of acid mine water which comprises:
neutralizing said water with slag containing metallic oxides;
separating said water from said slag;
withdrawing said water;
drying said slag;
introducing said slag and solids into a molten bath so that sulfates contained therein are reduced to sulfides and iron hydroxide contained therein reacts to form free iron;
introducing oxygen into said molten iron bath;
introducing sulfur-bearing carbonaceous fuel containing pyrites into said molten iron bath so that carbon in said fuel reacts with said oxygen to form carbon monoxide, sulfur in said fuel reacts with metallic oxides in said slag to form additional sulfides, and pyrites in said fuel react to form free iron;
withdrawing said carbon monoxide from said molten iron bath;
withdrawing said free iron from said molten iron bath;
withdrawing slag containing sulfides from said molten iron bath;
converting said sulfides to elemental sulfur;
withdrawing said elemental sulfur; and
recycling at least a portion of said slag containing metallic oxides for neutralizing said water.

14. The process of claim 13 together with the additional steps of:
reacting said carbon monoxide with additional oxygen so that carbon dioxide is formed thereby providing heat energy; and
withdrawing said carbon dioxide.

15. A process for the purification of acid mine water which comprises:
distilling said water so that dissolved and entrained solids are separated from said water;
withdrawing said water;
drying said solids;
introducing said dried solids into a molten iron bath containing carbon so that sulfates contained in said solids are reduced to sulfides;
withdrawing slag containing sulfides from said molten iron bath;
converting said sulfides to elemental sulfur; and
withdrawing said elemental sulfur.

16. A process for the purification of acid mine water which comprises:
distilling said water so that dissolved and entrained solids are separated from said water;
withdrawing said water;
drying said solids;
introducing said dried solids into a molten iron bath so that sulfates contained therein are reduced to sulfides;
introducing oxygen into said molten iron bath;
introducing carbonaceous fuel into said molten iron bath so that carbon in said fuel reacts with said oxygen to form carbon monoxide;
withdrawing said carbon monoxide from said molten iron bath;
withdrawing slag containing sulfides from said molten iron bath;
converting said sulfides to elemental sulfur; and
withdrawing said elemental sulfur.

17. The process of claim 16 together with the additional steps of:
reacting said carbon monoxide with additional oxygen so that carbon dioxide is formed thereby providing heat energy; and
withdrawing said carbon dioxide.

18. A process for the purification of acid mine water which comprises:
distilling said water so that dissolved and entrained solids are separated from said water;
withdrawing said water;
drying said solids;
introducing said dried solids into a molten iron bath so that sulfates contained therein are reduced to sulfides;
introducing oxygen into said molten iron bath;
introducing sulfur-bearing carbonaceous fuel into said molten iron bath so that carbon in said fuel reacts with metallic oxides in said slag to form additional sulfides;
withdrawing said carbon monoxide from said molten iron bath;
withdrawing slag containing sulfides from said molten iron bath;
converting said sulfides to elemental sulfur; and
withdrawing said elemental sulfur.

19. The process of claim 16 together with the additional steps of:
reacting said carbon monoxide with additional oxygen so that carbon dioxide is formed thereby providing heat energy; and
withdrawing said carbon dioxide.

20. A process for the purification of acid mine water which comprises:
distilling said water so that dissolved and entrained solids are separated from said water;
withdrawing said water;
drying said solids;
introducing said solids into a molten iron bath so that sulfates contained therein are reduced to sulfides and iron hydroxide contained therein reacts to form free iron;
introducing oxygen into said molten iron bath;
introducing sulfur-bearing carbonaceous fuel containing pyrites into said molten iron bath so that carbon in said fuel reacts with said oxygen to form carbon monoxide, sulfur in said fuel reacts with metallic oxides in said slag to form additional sulfides, and pyrites in said fuel react to form free iron;
withdrawing said carbon monoxide from said molten iron bath;
withdrawing said free iron from said molten iron bath;
withdrawing slag containing sulfides from said molten iron bath;
converting said sulfides to elemental sulfur; and
withdrawing said elemental sulfur.

21. The process of claim 20 together with the additional steps of:
reacting said carbon monoxide with additional oxygen so that carbon dioxide is formed thereby providing heat energy; and
withdrawing said carbon dioxide.

22. A process for the purification of acid mine water which comprises:
neutralizing said water with slag containing metallic oxides;
separating said water from said slag;
distilling said water so that dissolved and entrained solids are separated from said water;
withdrawing said water;
combining at least a portion of said slag with said solids;
drying said slag and solids;
introducing said dried slag and solids into a molten iron bath containing carbon so that sulfates contained in said slag and solids are reduced to sulfides;
withdrawing slag containing sulfides from said molten iron bath;
converting said sulfides to elemental sulfur;
withdrawing said elemental sulfur; and
recycling at least a portion of said slag containing metallic oxides for neutralizing said water.

23. A process for the purification of acid mine water which comprises:
neutralizing said water with slag containing metallic oxides;
separating said water from said slag;
distilling said water so that dissolved and entrained solids are separated from said water;
withdrawing said water;
combining at least a portion of said slag with said solids;

drying said slag and solids;
introducing said dried slag and solids into a molten iron bath so that sulfates contained therein are reduced to sulfides;
introducing oxygen into said molten iron bath;
introducing carbonaceous fuel into said molten iron bath so that carbon in said fuel reacts with said oxygen to form carbon monoxide;
withdrawing said carbon monoxide from said molten iron bath;
withdrawing slag containing sulfides from said molten iron bath;
converting said sulfides to elemental sulfur;
withdrawing said elemental sulfur, and
recycling at least a portion of said slag containing metallic oxides for neutralizing said water.

24. The process of claim 23 together with the additional steps of:
reacting said carbon monoxide with additional oxygen so that carbon dioxide is formed thereby providing heat energy; and
withdrawing said carbon dioxide.

25. A process for the purification of acid mine water which comprises:
neutralizing said water with slag containing metallic oxides;
separating said water from said slag;
distilling said water so that dissolved and entrained solids are separated from said water;
withdrawing said water;
combining at least a portion of said slag with said solids;
drying said slag and solids;
introducing said dried slag and solids into a molten iron bath so that sulfates contained therein are reduced to sulfides;
introducing oxygen into said molten iron bath;
introducing sulfur-bearing carbonaceous fuel into said molten iron bath so that carbon in said fuel reacts with said oxygen to form carbon monoxide, and sulfur in said fuel reacts with metallic oxides in said slag to form additional sulfides;
withdrawing said carbon monoxide from said molten iron bath;
withdrawing slag containing sulfides from said molten iron bath;
converting said sulfides to elemental sulfur;
withdrawing said elemental sulfur; and
recycling at least a portion of said slag containing metallic oxides for neutralizing said water.

26. The process of claim 25 together with the additional steps of:
reacting said carbon monoxide with additional oxygen so that carbon dioxide is formed thereby providing heat energy; and
withdrawing said carbon dioxide.

27. A process for the purification of acid mine water which comprises:
neutralizing said water with slag containing metallic oxides;
separating said water from said slag;
distilling said water so that dissolved and entrained solids are separated from said water;
withdrawing said water;
combining at least a portion of said slag with said solids;
drying said slag and solids;
introducing said slag and solids into a molten iron bath so that sulfates contained therein are reduced to sulfides and iron hydroxide contained therein reacts to form free iron;
introducing oxygen into said molten iron bath;
introducing sulfur-bearing carbonaceous fuel containing pyrites into said molten iron bath so that carbon in said fuel reacts with said oxygen to form carbon monoxide, sulfur in said fuel reacts with metallic oxides in said slag to form additional sulfides, and pyrites in said fuel react to form free iron;
withdrawing said carbon monoxide from said molten iron bath;
withdrawing said free iron from said molten iron bath;
withdrawing slag containing sulfides from said molten iron bath;
converting said sulfides to elemental sulfur;
withdrawing said elemental sulfur; and
recyling at least a portion of said slag containing metallic oxides for neutralizing said water.

28. The process of claim 27 together with the additional steps of:
reacting said carbon monoxide with additional oxygen so that carbon dioxide is formed thereby providing heat energy; and
withdrawing said carbon dioxide.

References Cited

UNITED STATES PATENTS

| | | | |
|---|---|---|---|
| 3,203,758 | 8/1965 | Wainer | 75—29 |
| 3,148,950 | 9/1964 | Mugg | 23—224 |
| 3,460,912 | 8/1969 | Squires | 23—224 |
| 3,205,064 | 9/1965 | Chang | 75—3 |
| 3,476,553 | 11/1969 | Sebba | 75—108 |
| 2,901,321 | 8/1959 | Horn | 75—6 |
| 3,044,868 | 7/1962 | Francis | 75—29 |
| 3,175,900 | 3/1965 | Johnson | 75—11 |
| 2,746,920 | 5/1956 | Wunderley | 75—3 |

L. DEWAYNNE RUTLEDGE, Primary Examiner

P. D. ROSENBERG, Assistant Examiner

U.S. Cl. X.R.

75—1, 23, 24; 423—566